(12) United States Patent
Johnson

(10) Patent No.: US 11,591,196 B2
(45) Date of Patent: Feb. 28, 2023

(54) MANUAL PALLET JACK HITCH AND RELATED SYSTEMS AND METHODS

(71) Applicant: Dane Technologies, Inc., Maple Grove, MN (US)

(72) Inventor: Dan Johnson, Medina, MN (US)

(73) Assignee: Dane Technologies, Inc., Maple Grove, MN (US)

( * ) Notice: Subject to any disclaimer, the term of this patent is extended or adjusted under 35 U.S.C. 154(b) by 215 days.

(21) Appl. No.: 16/738,781

(22) Filed: Jan. 9, 2020

(65) Prior Publication Data

US 2020/0216299 A1    Jul. 9, 2020

Related U.S. Application Data

(60) Provisional application No. 62/790,225, filed on Jan. 9, 2019.

(51) Int. Cl.
| | |
|---|---|
| *B66F 9/075* | (2006.01) |
| *B62B 5/00* | (2006.01) |
| *B60D 1/04* | (2006.01) |
| *B60D 1/46* | (2006.01) |
| *B60D 1/24* | (2006.01) |
| *B60D 1/00* | (2006.01) |
| *B66F 9/06* | (2006.01) |

(52) U.S. Cl.
CPC ............ *B66F 9/07504* (2013.01); *B60D 1/04* (2013.01); *B60D 1/246* (2013.01); *B60D 1/465* (2013.01); *B62B 5/0079* (2013.01); *B66F 9/07572* (2013.01); *B60D 2001/005* (2013.01); *B62B 5/0069* (2013.01); *B66F 9/063* (2013.01)

(58) Field of Classification Search
CPC .......... B60D 1/04; B60D 1/246; B60D 1/465; B60D 2001/005; B62B 5/0079; B62B 5/0076; B66F 9/063
See application file for complete search history.

(56) References Cited

U.S. PATENT DOCUMENTS

| | | | |
|---|---|---|---|
| 2,846,018 A | 8/1958 | Puckett | |
| 4,148,499 A * | 4/1979 | Johnson | B60D 1/465 280/490.1 |
| 5,366,338 A | 11/1994 | Mortensen | |
| 5,439,069 A * | 8/1995 | Beeler | B62D 51/005 180/19.1 |
| 6,220,379 B1 * | 4/2001 | Schugt | B62B 3/1404 180/65.1 |
| 6,244,813 B1 | 6/2001 | Cataldo | |
| 7,857,342 B2 * | 12/2010 | Holtan | B60D 1/00 280/415.1 |
| 8,205,904 B1 * | 6/2012 | Carter | B60D 1/075 280/495 |
| 8,684,373 B2 * | 4/2014 | Holtan | B62B 3/00 280/47.11 |

(Continued)

FOREIGN PATENT DOCUMENTS

| | | |
|---|---|---|
| GB | 2279934 A | 1/1995 |
| WO | 2018172932 A2 | 9/2018 |

*Primary Examiner* — Tony H Winner
(74) *Attorney, Agent, or Firm* — Sean D. Solberg

(57) ABSTRACT

The various embodiments disclosed herein relate to an interchangeable hitch mechanism that is coupleable to a pusher device. Other implementations relate to a pusher device having such an interchangeable hitch mechanism that can be removably coupleable to a manual jack pallet.

20 Claims, 8 Drawing Sheets

(56) References Cited

U.S. PATENT DOCUMENTS

| | | | | |
|---|---|---|---|---|
| 9,010,771 B2* | 4/2015 | Holtan | ................... | B62B 3/001 |
| | | | | 280/47.11 |
| 9,393,981 B1* | 7/2016 | Lee | ....................... | G05D 1/028 |
| 10,023,043 B2* | 7/2018 | Johnson | .................. | B62B 5/005 |
| 10,106,002 B2* | 10/2018 | McAllister | ............... | B60D 1/06 |
| 2006/0027998 A1 | 2/2006 | Lewis | | |
| 2006/0273547 A1 | 12/2006 | Holtan et al. | | |
| 2014/0291594 A1 | 10/2014 | Newell | | |
| 2015/0203140 A1 | 7/2015 | Holtan et al. | | |
| 2016/0144678 A1* | 5/2016 | Kringstad | .............. | B60D 1/246 |
| | | | | 280/490.1 |
| 2017/0050832 A1* | 2/2017 | Newell | ................ | B62B 3/0612 |
| 2018/0208226 A1* | 7/2018 | Tse | ....................... | B62B 5/0053 |

* cited by examiner

MANUAL PALLET JACK HITCH AND RELATED SYSTEMS AND METHODS

CROSS-REFERENCE TO RELATED APPLICATION(S)

This application claims the benefit under 35 U.S.C. § 119(e) to U.S. Provisional Application 62/790,225, filed Jan. 9, 2019 and entitled "Manual Pallet Jack Hitch and Related Systems and Methods," which is hereby incorporated herein by reference in its entirety.

FIELD

The various embodiments herein relate to warehouse transport and hauling equipment, and more specifically to pallet jacks and power-assist devices for coupling to and providing motive power for transporting such jacks around a warehouse or similar environment. More specifically, various implementations relate to interchangeable hitching mechanisms for use in combination with the power-assist devices to couple such devices to the various known manual pallet jacks.

BACKGROUND

There are multiple manual pallet jacks on the market. One example of such a manual jack is shown in FIGS. 1A and 1B, which depict standard pallet jack 10. The jack 10 has a body 12, two pallet forks 14A, 14B extending from the body 12, two fork wheels 16A, 16B at the distal ends of the forks 14A, 14B, a steering mechanism 18, and two swivel wheels 20A, 20B operably coupled to the steering mechanism 18. As best shown in FIG. 1B, the two swivel wheels 20A, 20B are coupled to the elongate member 22 of the steering mechanism 18 via a fixed axle 24, which is fixedly coupled to the elongate member 22. Each of the swivel wheels 20A, 20B rotate around the fixed axle 24. When the steering mechanism 18 is urged to the right or left by a user, this causes the fixed axle 24 to rotate around an axis parallel to the steering mechanism 18, thereby causing the wheels 20A, 20B to swivel. This action allows the user to steer the pallet jack 10.

In some rare circumstances, manual pallet jacks such as the one described above are modified to add a motor that can be used to propel the jack, thereby reducing the amount of effort required by the user. However, such modifications are unusual and there are very few commercial options available for such a retro-fitting, probably because the known commercial options are not optimal. One of the few known options is a product called the Power Pallet™, which is available from PowerHandling Inc. of Spokane, Wash. One of the disadvantages of this product is that it doesn't fit all manual pallet jacks. Another disadvantage is that the product is mounted on the front of the handle and swivel wheels of the pallet jack and extends from the front, thereby increasing the size and footprint thereof. This increase to the overall size and footprint of the pallet jack handle causes interference between the Power Pallet product on the handle and the jack itself when a user attempts to turn, thereby making it difficult to steer the jack.

There is a need in the art for an improved device, system, and method for propelling a manual pallet jack.

BRIEF SUMMARY

Discussed herein are various embodiments of power-assist devices with interchangeable hitch mechanisms that can couple to many known manual pallet jacks.

In Example 1, an interchangeable hitch mechanism comprises a distal hitch body, an angled coupling feature defined at or near the distal end of the distal hitch body, a mateable coupling structure disposed on the distal hitch body, a proximal hitch body, a tensioned piston assembly, and a pusher device coupling mechanism disposed at a proximal end of the proximal hitch body. The tensioned piston assembly comprises a stationary piston body fixedly coupled to the proximal hitch body, and an extendable tensioned piston rod extending from the stationary piston body, the extendable tensioned piston rod fixedly coupled to the distal hitch body.

Example 2 relates to the interchangeable hitch mechanism according to Example 1, wherein the mateable coupling structure comprises a notch.

Example 3 relates to the interchangeable hitch mechanism according to Example 1, wherein the extendable tensioned piston rod is moveable between a retracted position and an extended position.

Example 4 relates to the interchangeable hitch mechanism according to Example 3, wherein the retracted position is an untensioned position and the extended position is a tensioned position.

Example 5 relates to the interchangeable hitch mechanism according to Example 3, wherein the movement of the piston rod into the extended position causes the distal hitch body to move into a lowered position.

Example 6 relates to the interchangeable hitch mechanism according to Example 3, wherein the movement of the piston rod into the retracted position causes the distal hitch body to move into a raised position.

Example 7 relates to the interchangeable hitch mechanism according to Example 1, further comprising an actuation assembly operably coupled to the distal hitch body, wherein actuation of the actuation assembly can move the distal hitch body between a raised position and a lowered position.

In Example 8, a pusher device for coupling to and propelling a manual jack pallet comprises a pusher body, at least two wheels operably coupled to the pusher body, an actuator operably coupled to at least one of the at least two wheels, a steering mechanism coupled to the at least one of the at least two wheels, a pusher device coupling structure operably coupled to the pusher body, and an interchangeable hitch mechanism removably coupled to the pusher device coupling structure. The interchangeable hitch mechanism comprises a proximal hitch body comprising a pusher device coupling mechanism at a proximal end thereof, wherein the coupling mechanism is removably coupleable with the pusher device coupling structure, and a tensioned piston assembly comprising a stationary piston body fixedly coupled to the proximal hitch body, and an extendable tensioned piston rod extending from the stationary piston body. Further, the interchangeable hitch mechanism also comprises a distal hitch body fixedly coupled to the extendable tensioned piston rod, and a mateable coupling structure disposed on the distal hitch body, wherein the distal hitch body is removably coupleable to the manual jack pallet at the mateable coupling structure.

Example 9 relates to the pusher device according to Example 8, wherein the distal hitch body further comprises an angled coupling feature defined at or near a distal end of the distal hitch body.

Example 10 relates to the pusher device according to Example 8, wherein the mateable coupling structure comprises a notch.

Example 11 relates to the pusher device according to Example 8, wherein the extendable tensioned piston rod is moveable between a retracted position and an extended position.

Example 12 relates to the pusher device according to Example 11, wherein the retracted position is an untensioned position and the extended position is a tensioned position.

Example 13 relates to the pusher device according to Example 11, wherein the movement of the piston rod into the extended position causes the distal hitch body to move into a lowered position and the movement of the piston rod into the retracted position causes the distal hitch body to move into a raised position.

Example 14 relates to the pusher device according to Example 8, further comprising an actuation assembly operably coupled to the distal hitch body, wherein actuation of the actuation assembly can urge the distal hitch body toward a lowered position.

In Example 15, a manual pallet jack pushing system comprises a pusher device comprising a pusher device coupling structure and an interchangeable hitch mechanism removably coupled to the pusher device coupling structure, the interchangeable hitch mechanism comprising a proximal hitch body comprising a pusher device coupling mechanism at a proximal end thereof, wherein the coupling mechanism is removably coupleable with the pusher device coupling structure, and a tensioned piston assembly comprising a stationary piston body fixedly coupled to the proximal hitch body, and an extendable tensioned piston rod extending from the stationary piston body. The interchangeable hitch mechanism further comprises a distal hitch body fixedly coupled to the extendable tensioned piston rod, wherein the distal hitch body is removably coupleable to the manual jack pallet at the mateable coupling structure, a mateable coupling structure disposed on the distal hitch body, and an actuation assembly operably coupled to the distal hitch body, wherein actuation of the actuation assembly can urge the distal hitch body between a raised position and a lowered position. Further, the pushing system further comprises a hydraulic release actuation mechanism disposed on a manual pallet jack, wherein the hydraulic release actuation mechanism is disposed in contact with a hydraulic release button, wherein actuation of the hydraulic release actuation mechanism causes actuation of the hydraulic release button.

Example 16 relates to the pushing system according to Example 15, wherein the pusher device is an autonomous pusher device.

Example 17 relates to the pushing system according to Example 15, wherein the extendable tensioned piston rod is moveable between a retracted position and an extended position.

Example 18 relates to the pushing system according to Example 17, wherein the movement of the piston rod into the extended position corresponds to movement of the distal hitch body into the lowered position and the movement of the piston rod into the retracted position corresponds to movement of the distal hitch body into the raised position.

Example 19 relates to the pushing system according to Example 15, further comprising a remote control in communication with the actuation assembly, wherein the remote control comprises a first actuation mechanism for actuating the actuation assembly to urge the distal hitch body into the lowered position.

Example 20 relates to the pushing system according to Example 19, wherein the remote control is in communication with the hydraulic release actuation mechanism, wherein the remote control comprises a second actuation mechanism for actuating the hydraulic release actuation mechanism to actuate the hydraulic release button.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

The various embodiments disclosed and contemplated herein relate to an interchangeable hitch that is interchangeably coupled to any power assist device such that the hitch can be used to couple the power assist device to a known manual pallet jack and transport that jack (and its cargo in many cases) as desired. According to certain exemplary embodiments, a set of different interchangeable hitches is provided, with each hitch configured to mateably couple to a different set of known manual power jacks. As such, the interchangeable hitch mechanisms make it possible for a power-assist device to couple to almost any known manual pallet jack to propel the jack (and, in many cases, its cargo) around a warehouse or similar environment, rather than requiring a person to physically push the jack around that environment.

Figure 1A:
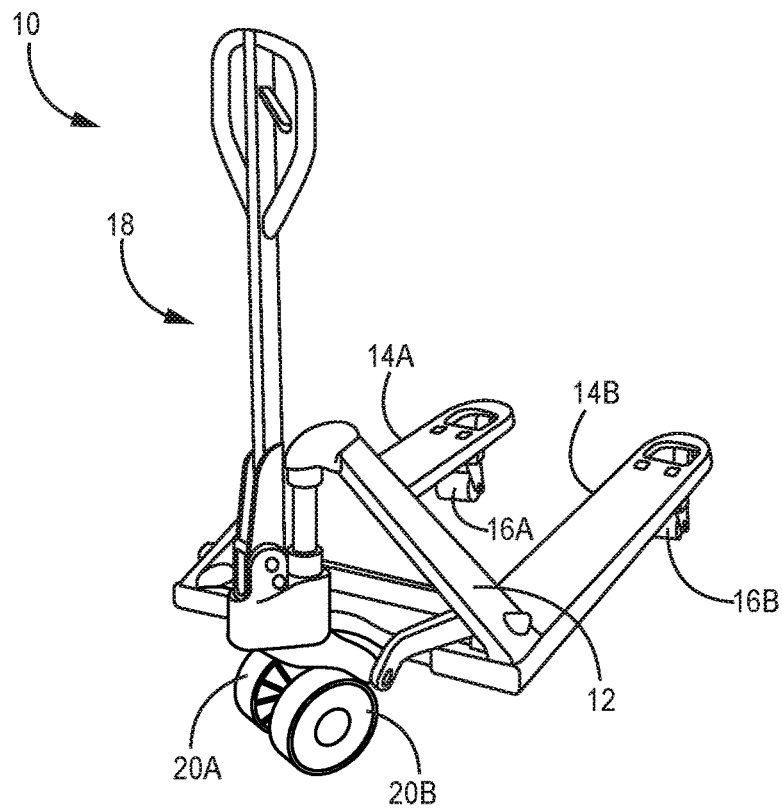
FIG. 1A is a perspective view of a known manual pallet jack.
Figure 1B:
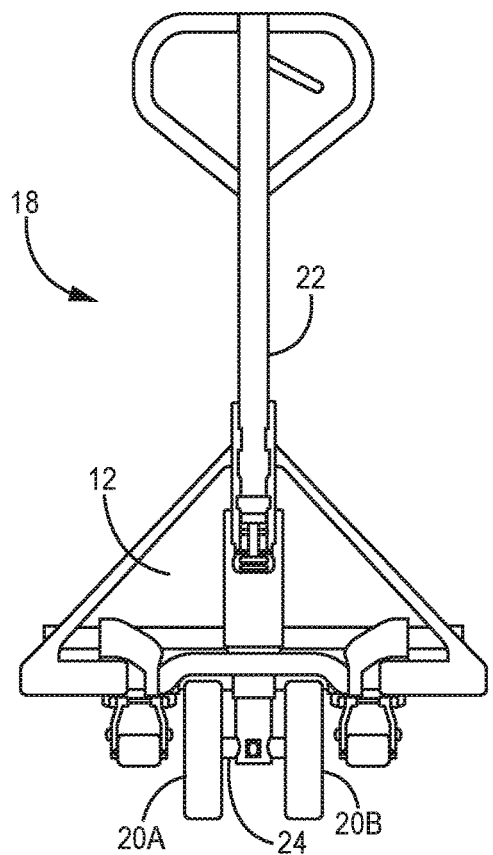
FIG. 1B is a rear view of a known manual pallet jack.
Figure 2A:
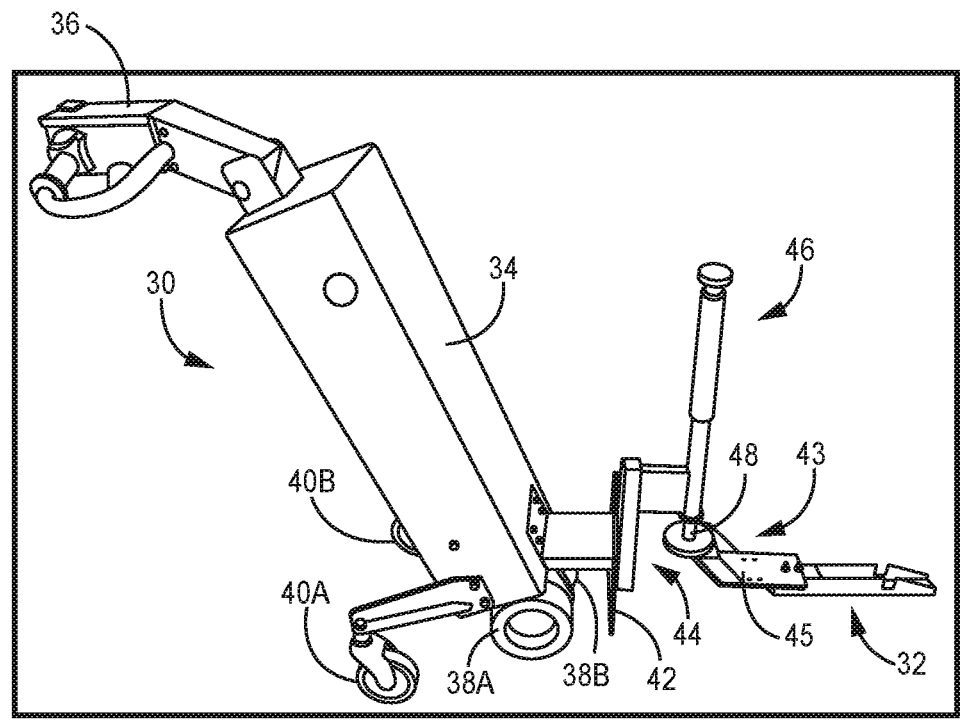
FIG. 2A is a side perspective view of a pusher device with an interchangeable hitch assembly, according to one embodiment.
Figure 2B:
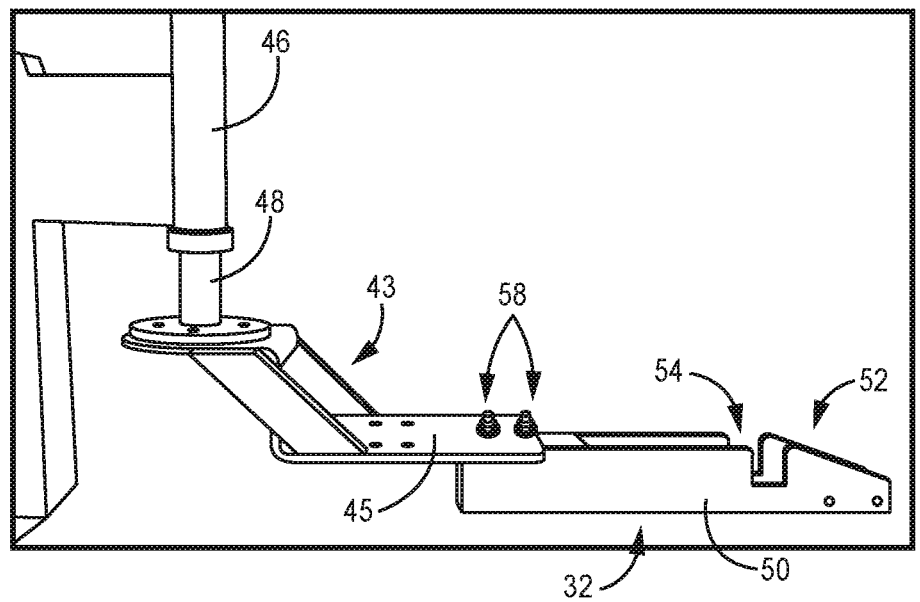
FIG. 2B is an enlarged side perspective view of the interchangeable hitch assembly of FIG. 2A, according to one embodiment.

FIGS. 2A and 2B depict a powered pusher device 30 having an interchangeable hitching mechanism (also referred to as a "hitch") 32 according to one embodiment. The powered pusher device 30 in this implementation has a body 34, a steering mechanism 36, powered wheels 38A, 38B, rear wheels 40A, 40B, and a coupling mechanism 42 disposed on a front side of the body 34. The interchangeable hitch 32 is removably coupled to the coupling mechanism 42 as shown. It is further understood that any known pusher device configured for propelling carts (such as shopping carts, warehouse carts, and the like) or any other wheeled objects can be utilized herein. For example, another known pusher device 88 is depicted in the embodiment of FIGS. 6A-6D, which is described below in additional detail.

As best shown in FIG. 2B, the hitch 32 has an elongate hitch body 50, an angled distal portion (also known as a "hitch tip" or "tip") 52 that is configured to be positionable under the target component of the target manual pallet jack (not shown), and a mateable coupling feature (or "structure") 54 that in this case is a notch 54 formed in a top portion of the elongate hitch body 50 such that an corresponding feature on the target jack (not shown) can be positioned within the notch 54, thereby coupling the hitch 32 to the jack (not shown).

Further, continuing with FIGS. 2A and 2B, the hitching mechanism 32 has a central hitch body 43. The central body 43 has a proximal pusher coupling mechanism 44 at the proximal end of the central body 43 that is configured to be removably coupleable with the coupling mechanism 42 of the powered pusher device 30. That is, the proximal pusher coupling mechanism 44 can be any mechanism 44 that can be removably attached to the pusher device coupling mechanism 42. In addition, the central body 43 has a distal hitch coupling mechanism 45 that is removably coupleable to the elongate hitch body 50. More specifically, in this specific embodiment, the distal hitch coupling mechanism 45 is two receiving holes (not shown) in the top portion of the distal end of the central body 43 that can receive two bolts 58 such that the bolts 58 are disposed through the receiving holes (not shown) in the central body 43 and into two receiving holes (not shown) in the proximal end of the elongate hitch body 50, thereby coupling the hitch body 50 to the central hitch body 43. Alternatively, any known coupling mechanism or feature can be used to removably couple the elongate hitch body 32 to the distal hitch coupling mechanism 45 such that the elongate hitch body 50 can be coupled to and removed from the central hitch body 43 as needed. For example, in one embodiment, the elongate hitch body 50 can be interchangeable with other hitch bodies (not shown) that require different hitch mechanisms/interfaces depending on the manual pallet jack to which the hitch body 50 will be coupling.

In addition, the central body 43 has a tensioned piston 46 that moveably couples the proximal pusher coupling mechanism 44 to the distal hitch coupling mechanism 45. The tensioned piston 46 has a stationary piston body 47 that is fixedly coupled to the proximal pusher coupling mechanism 44. Further, the piston 46 has a moveable tensioned piston rod 48 slidably disposed within the piston body 47. The piston rod 48 is fixedly coupled to the distal hitch coupling mechanism 45. In one embodiment, the piston rod 48 moves within the piston body 47 between a retracted position in which the rod 48 is untensioned and an extended position in which the rod 48 is tensioned, wherein the extended position is the position in which the distal hitch coupling mechanism 45 is disposed at a greater distance from the piston body 47 than when the rod 48 is in the retracted position. In other words, the distal hitch coupling mechanism 45 and the elongate hitch body 32 are closer to the floor or ground on which the pusher 30 is located in the extended position and further from the floor or ground in the retracted position. Thus, the piston rod 48 in its resting configuration is in the retracted position, while the rod 48 is in its tensioned configuration when it is in its extended position. As a result, the distal hitch coupling mechanism 45 and the elongate hitch body 32 must be urged downward (toward the floor/ground) by an external force in order to urge the piston rod 48 toward its extended position, while the rod 48 will return to its resting position (retracted position) when the external force is removed.

In certain embodiments, when a user wants to lower the hitch body 32, the user can manually urge the piston rod 48 downward by pressing an appropriate button or lever on the tensioned piston 46. In such embodiments, the piston 46 can have an automatic or manual locking mechanism that locks the piston rod 48 in the extended position such that the user can then urge the hitch body 32 into position for hitching to a manual pallet jack as described in further detail below.

Figure 3A:
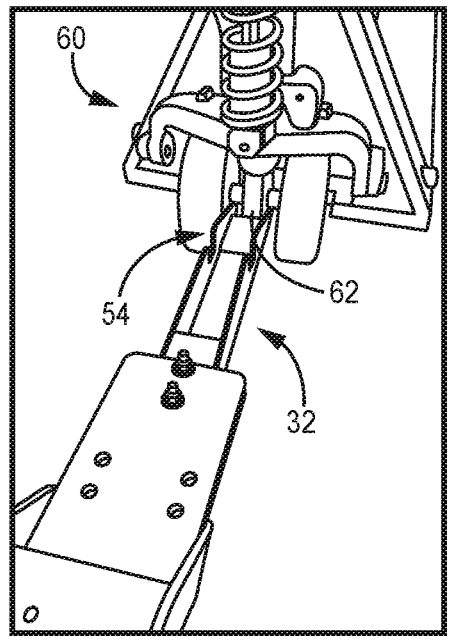
FIG. 3A is a perspective view of the interchangeable hitch assembly of FIG. 2A being urged toward a manual pallet jack, according to one embodiment.
Figure 3B:
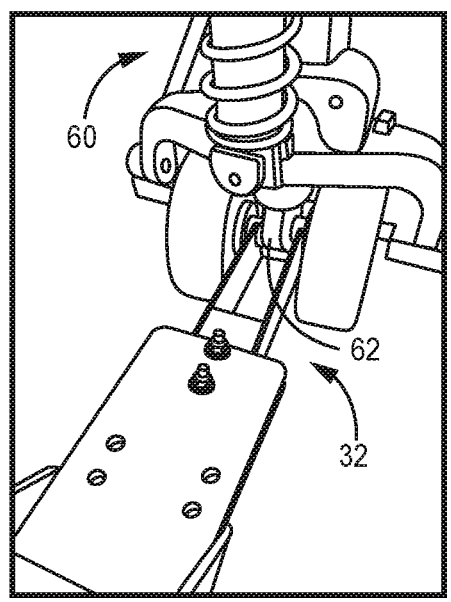
FIG. 3B is a perspective view of the interchangeable hitch assembly being coupled to the manual pallet jack of FIG. 3A, according to one embodiment.
Figure 3C:
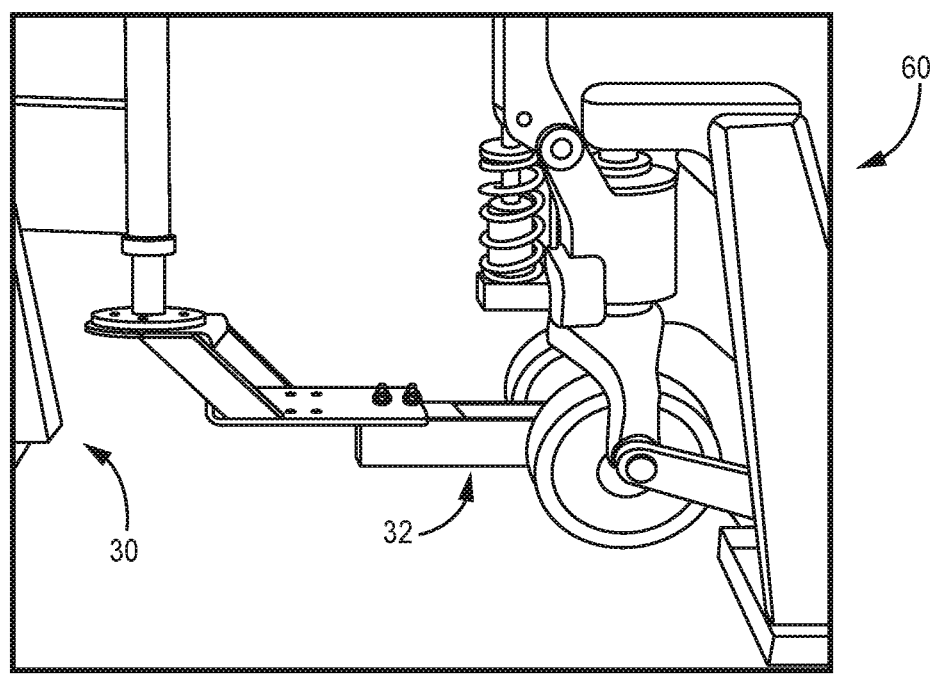
FIG. 3C is a side view of the interchangeable hitch assembly coupled to the manual pallet jack of FIG. 3A, according to one embodiment.

In use, as shown according to one exemplary embodiment in FIGS. 3A, 3B, and 3C, the pusher device 30 can be positioned such that the hitch 32 is urged toward the fixed axle 62 of a manual pallet jack 60 (similar to the known pallet jack 10 discussed above). More specifically, as best shown in FIG. 3A, the pusher device 30 is actuated to move toward the rear of the pallet jack 60 such that the hitch 32 is urged toward the fixed axle 62. When the hitch 32 is aligned correctly, the pusher device 30 is actuated to move forward until the hitch 32 is urged under the fixed axle 62 until the axle 62 is disposed within the notch 54, thereby coupling the jack 60 to the hitch 32 as best shown in FIGS. 3B and 3C. As discussed above, in certain embodiments, prior to positioning the hitch 32 under the fixed axle 62, a user actuates the piston rod 48 to move downward and lock such that the hitch 32 is in the extended position, such that it is disposed below the axle 62. Alternatively, if the rod 48 is not actuated by the user, the distal-most portion of the angled distal tip 52 can be positioned under and in contact with the fixed axle 62 such that the upper surface of the angled tip 52 contacts the fixed axle 62, thereby applying downward force to the elongate hitch body 50 as the angled tip 52 is advanced under the axle 62, which in turn urges the piston rod 48 downward, which allows the entire hitch 32 to be urged downward and under the fixed axle 62. As the hitch 32 is urged forward, the notch 54 moves forward until it reaches the fixed axle 62, at which point the axle 62 is positioned within the notch 54 as a result of the tensioned piston rod 48 urging the hitch body 50 upward, thereby coupling the hitch 32 to the axle 62 and thus the manual pallet jack 60.

Once the hitch 32 is coupled to the fixed axle 62 such that the pusher device 30 is coupled to the manual pallet jack 60, the pusher device 30 can be used to propel the pallet jack 60 to any desired location. That is, the positioning of the hitch 32 in a coupled relationship with the fixed axle 62 allows for the hitch 32 to be used to steer the pallet jack 60 (via the fixed axle 62) in a fashion similar to the use of the steering mechanism (not shown, but similar to the steering mechanism of 18 of the pallet jack 10 discussed above) to similarly steer the fixed axle 62 and the rear wheels coupled thereto.

Figure 4:
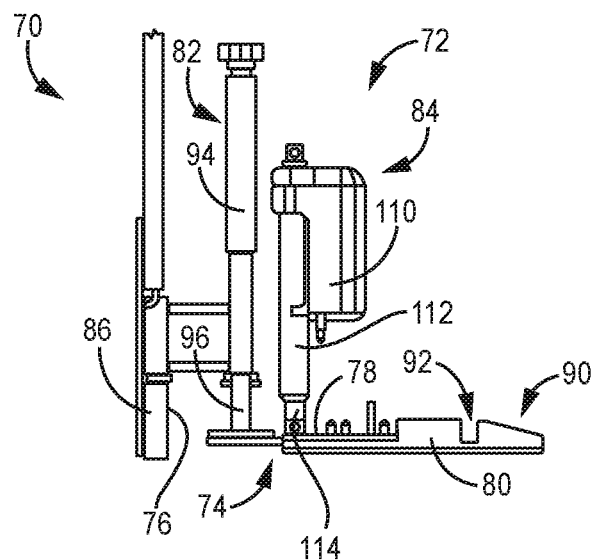
FIG. 4 is a side view of another interchangeable hitch assembly, according to another embodiment.

Another implementation of an interchangeable hitching system 70 with an interchangeable hitching mechanism 72 is depicted in FIGS. 4-7D. As best shown in FIG. 4, the interchangeable hitching mechanism (also referred to as a "hitch") 72 has a central body 74 that has a proximal pusher coupling mechanism 76, a distal hitch coupling mechanism 78, an elongate hitch body 80 removably coupled to the hitch coupling mechanism 78, a tensioned piston 82 that moveably couples the proximal pusher coupling mechanism 76 to the distal hitch coupling mechanism 78, and an actuation assembly 84 that can be actuated to urge the distal hitch coupling mechanism 78 and the elongate hitch body 80 downward as discussed in detail below.

The proximal pusher coupling mechanism 76 at the proximal end of the central body 74 is configured to be removably coupleable with the coupling mechanism 86 of a powered pusher device (such as powered pusher device 88 discussed below and best depicted in FIGS. 5A, 5B, and 7A-7D). As with the proximal pusher coupling mechanism 44 discussed above, the coupling mechanism 76 of this implementation can be any mechanism 76 that can be removably attached to the pusher device 88. Similarly, the distal hitch coupling mechanism 78 can be any known coupling mechanism or feature that can be used to removably couple the elongate hitch body 80 to the distal hitch coupling mechanism 78 such that the elongate hitch body 80 can be coupled to and removed from the central body 74 as needed.

In similar fashion to the elongate hitch body 50 discussed above, the instant elongate hitch body 80 of this exemplary embodiment has an angled distal portion (also known as a "hitch tip" or "tip") 90 that is configured to be positionable under the target component of the target manual pallet jack (not shown), and a mateable coupling feature (or "structure") 92 that in this case is a notch 92 formed in a top portion of the elongate hitch body 80 such that an corresponding feature on the target jack (not shown) can be positioned within the notch 92, thereby coupling the hitch 72 to the jack (not shown).

Figure 5A:
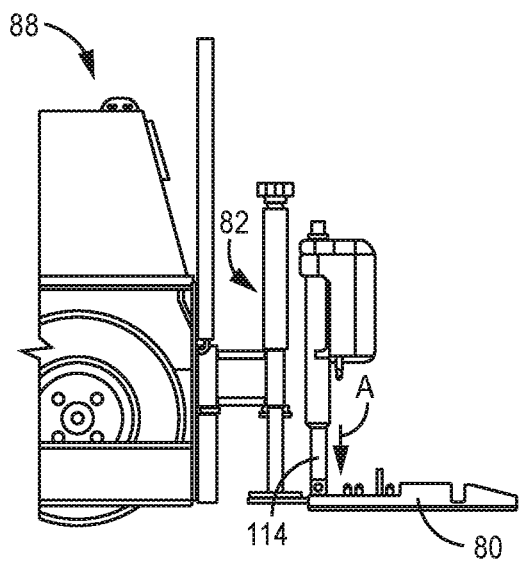
FIG. 5A is a side view of the interchangeable hitch assembly of FIG. 4 in the lowered position, according to one embodiment.
Figure 5B:
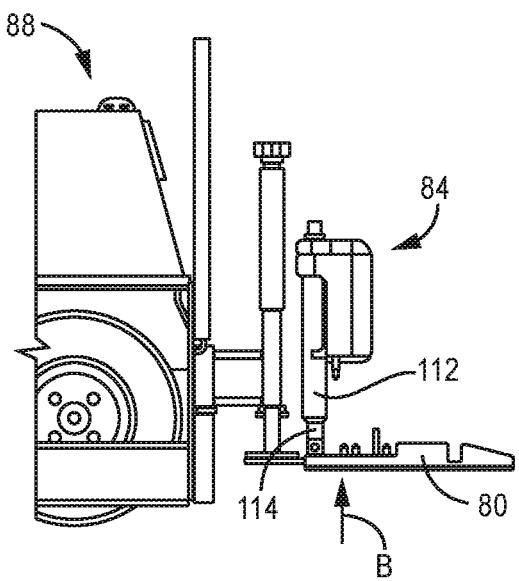
FIG. 5B is a side view of the interchangeable hitch assembly of FIG. 4 in the raised position, according to one embodiment.
Figure 6:
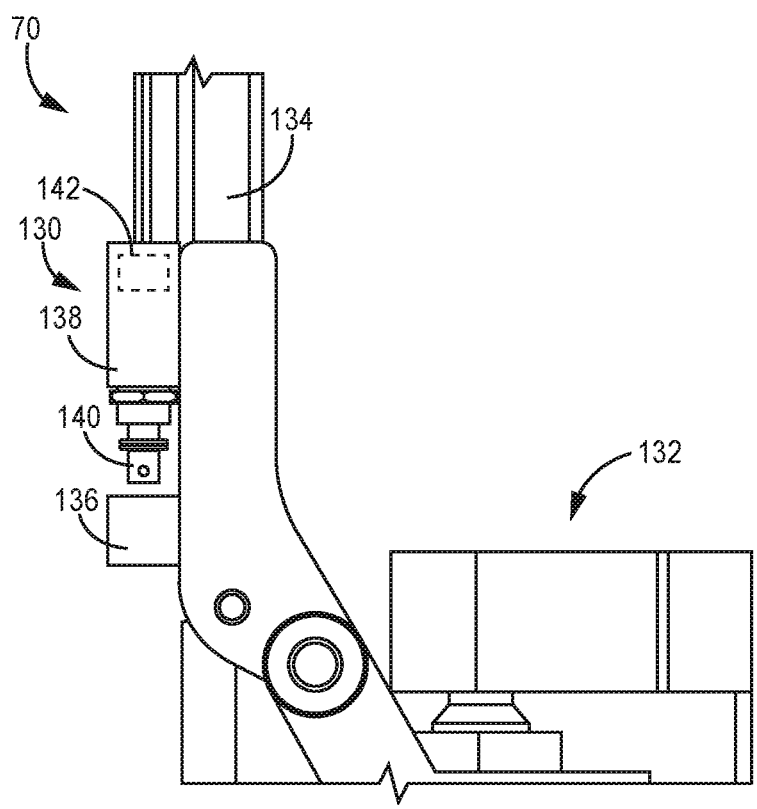
FIG. 6 is an enlarged side view of a hydraulic release button actuation mechanism, according to one embodiment.

In the embodiment of FIGS. 4-5B, the tensioned piston 82 is substantially similar to the tensioned piston 46 described above, with a stationary piston body 94 fixedly coupled to the proximal pusher coupling mechanism 76 and a moveable tensioned piston rod 96 slidably disposed within the piston body 94 and fixedly coupled to the distal hitch coupling mechanism 78. As in the embodiment depicted in FIGS. 2A and 2B, the piston rod 96 moves within the piston body 94 between a retracted position in which the rod 96 is untensioned and an extended position in which the rod 96 is tensioned, such that the distal hitch coupling mechanism 78 and the elongate hitch body 50 must be urged downward (toward the floor/ground) by an external force in order to urge the piston rod 96 toward its extended position, while the rod 96 will return to its resting position (retracted position) when the external force is removed.

In this implementation, the actuation assembly 84 has an actuation motor 110, a stationary actuation piston body 112, and an actuable piston rod 114 extending from the stationary piston body 112. The actuation motor 110 and piston body 112 are fixedly coupled to the proximal pusher coupling mechanism 76 and/or the stationary piston body 94, while the actuable piston rod 114 is coupled to or in contact with the distal hitch coupling mechanism 78. In operation, the actuation motor 110 can be actuated to cause the actuable piston rod 114 to move between an extended position (as best shown in FIG. 5A) and a retracted position (as best shown in FIG. 5B). The force applied to the rod 114 that urges the rod 114 toward and into the extended position is sufficient to overcome the upward force applied by the piston rod 96, thus resulting in the rod 114 urging the distal hitch coupling mechanism 78 and the elongate hitch body 50 toward their extended position as discussed above, thereby urging the hitch body 80 closer to the floor/ground. And movement of the rod 114 back toward the retracted position removes the downward force being applied to the distal hitch coupling mechanism 78 and the elongate hitch body 80, thereby allowing the upward force applied by the tensioned piston rod 96 to urge the coupling mechanism 78 and hitch body 80 upward/away from the floor/ground and toward the retracted position.

Further, in one implementation, the actuation assembly 84 has a wireless communication component (not shown) that can be used to communicate with the assembly 84 via a remove unit that can transmit wireless actuation instructions/signals to the assembly 84. As such, a user operating the system 70 can use a remote unit (either handheld or disposed on the pusher device 88, for example) to actuate the actuation assembly 84 to urge the actuable piston rod 114 downward or upward as desired. Alternatively, the actuation assembly 84 can be actuated in any known fashion.

In accordance with one embodiment, the interchangeable hitching system 70 can also have an optional actuation mechanism 130 that is attachable to the manual pallet jack (such as jack 132 discussed in additional detail below or any other manual pallet jack) to be coupled to the system 70. The actuation mechanism 130 is used to actuate the hydraulic release button 136 on the pallet jack 132. That is, most manual pallet jacks (such as jack 132) have a release button (such as release button 136) that can be actuated to release the hydraulic pressure in the hydraulic piston (not shown) that is used to raise the jack (such as 132) such that the cargo on the jack can be hauled to a different location. In this embodiment, the actuation mechanism 130 is used to remotely actuate that button, thereby triggering the pallet jack (such as 132) to release the hydraulic pressure and thereby lower the pallet jack forks (such as forks 133 discuss below) to the ground/floor. In one embodiment, this actuation mechanism 130 can be used to lower the pallet jack forks 133 and thereby lower the cargo on the pallet jack 132 such that the powered pusher device 88 can pull the pallet jack 132 out from under the lowered cargo while the pallet jack 132 is still coupled to the pusher device 88 via the hitch 72 such that the manual pallet jack 132 can then be transported elsewhere by the pusher device 88 for further use.

According to this specific implementation, the actuation mechanism 130 has an actuation body 138 with an actuation piston 140 extending therefrom. In one embodiment, the actuation mechanism has a wireless communication component (not shown) that allows for wireless control of the actuation mechanism 130 to actuate the release button 136 upon remote command. The command is sent from a remote unit that is actuated by a user and received at the wireless communication component (not shown), triggering the actuation motor 142 to actuate the piston 140 to extend distally and make contact with the release button 136, thereby actuating the release button and causing the forks of the pallet jack to be lowered to the ground/floor.

In the instant embodiment, the release button 136 on the pallet jack 132 is depicted as being positioned on the jack handle 134 as shown. However, it is understood that various different known pallet jacks have the release button (or other mechanism) disposed in different locations thereon, so it is understood that the actuation mechanism 130 of this embodiment can be disposed anywhere on the various pallet jacks as necessary to provide for actuation of the various different types of release buttons or other known mechanisms.

Figure 7A:
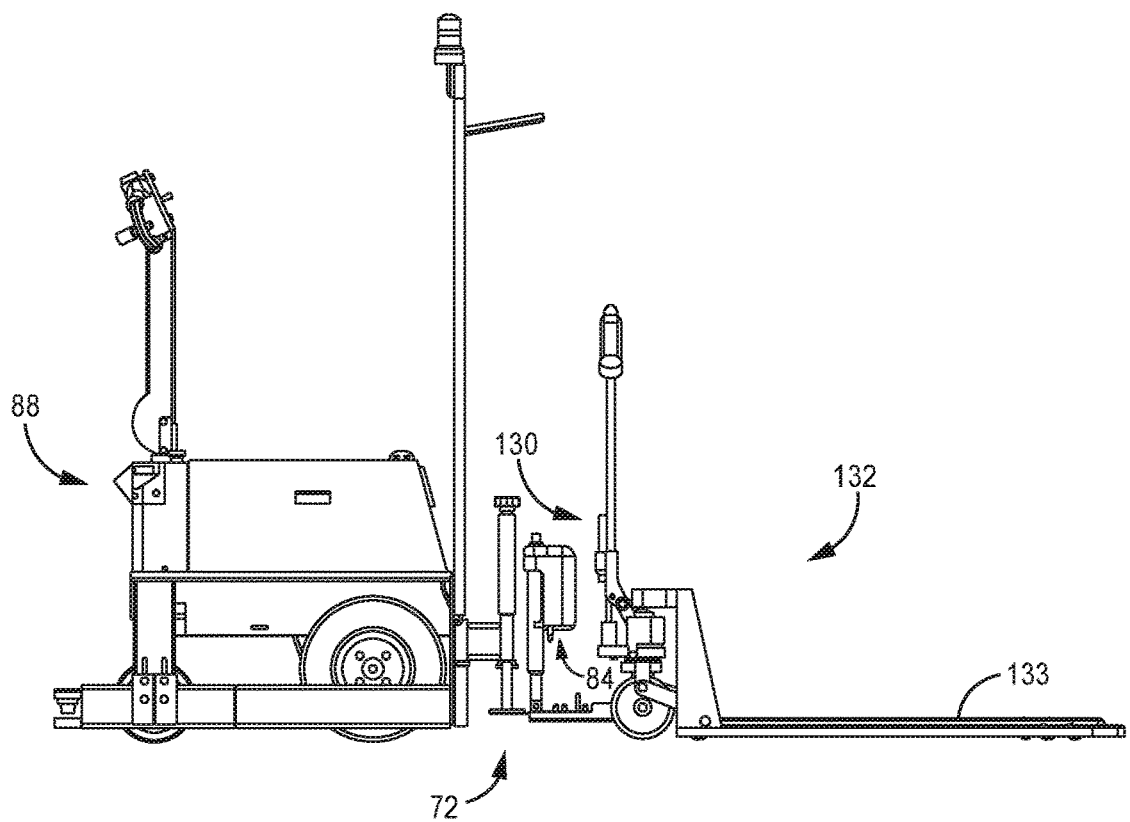
FIG. 7A is a side view of the interchangeable hitch assembly of FIG. 4 coupled to a manual pallet jack, according to one embodiment.
Figure 7B:
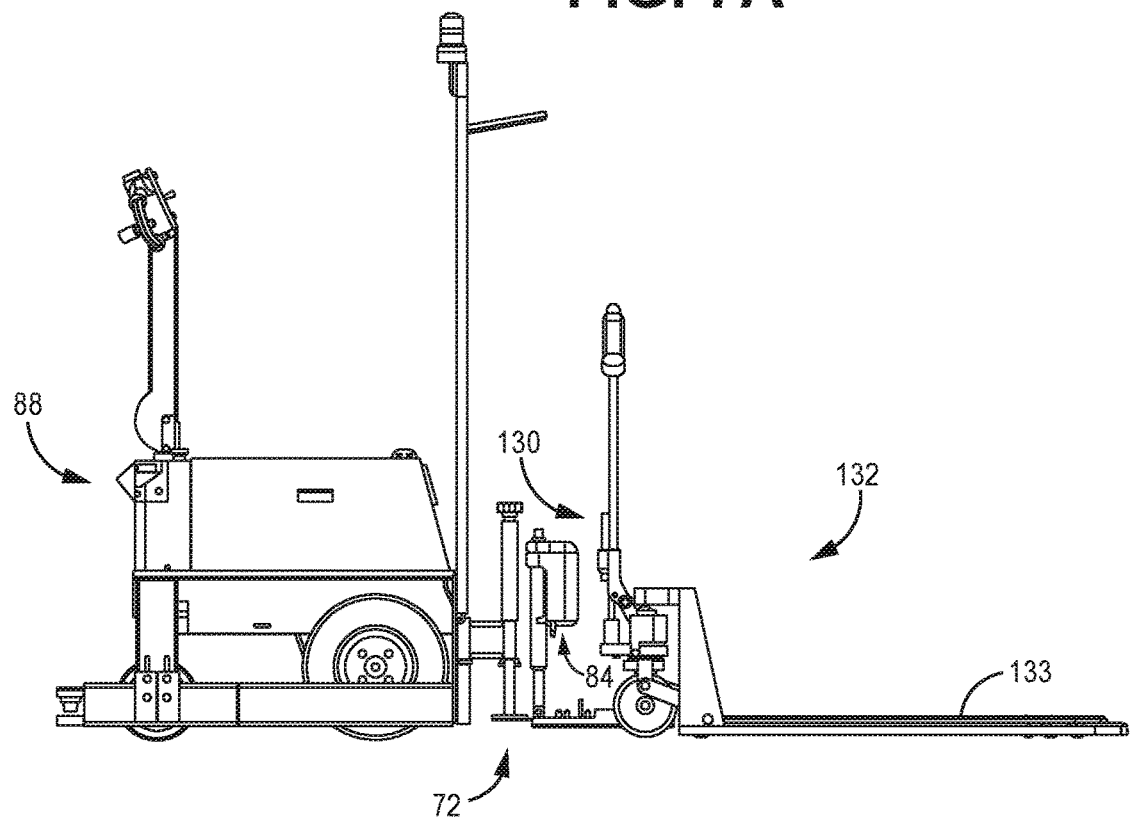
FIG. 7B is a side view of the interchangeable hitch assembly in the lowered position while being uncoupled from the manual pallet jack of FIG. 7A, according to one embodiment.
Figure 7C:
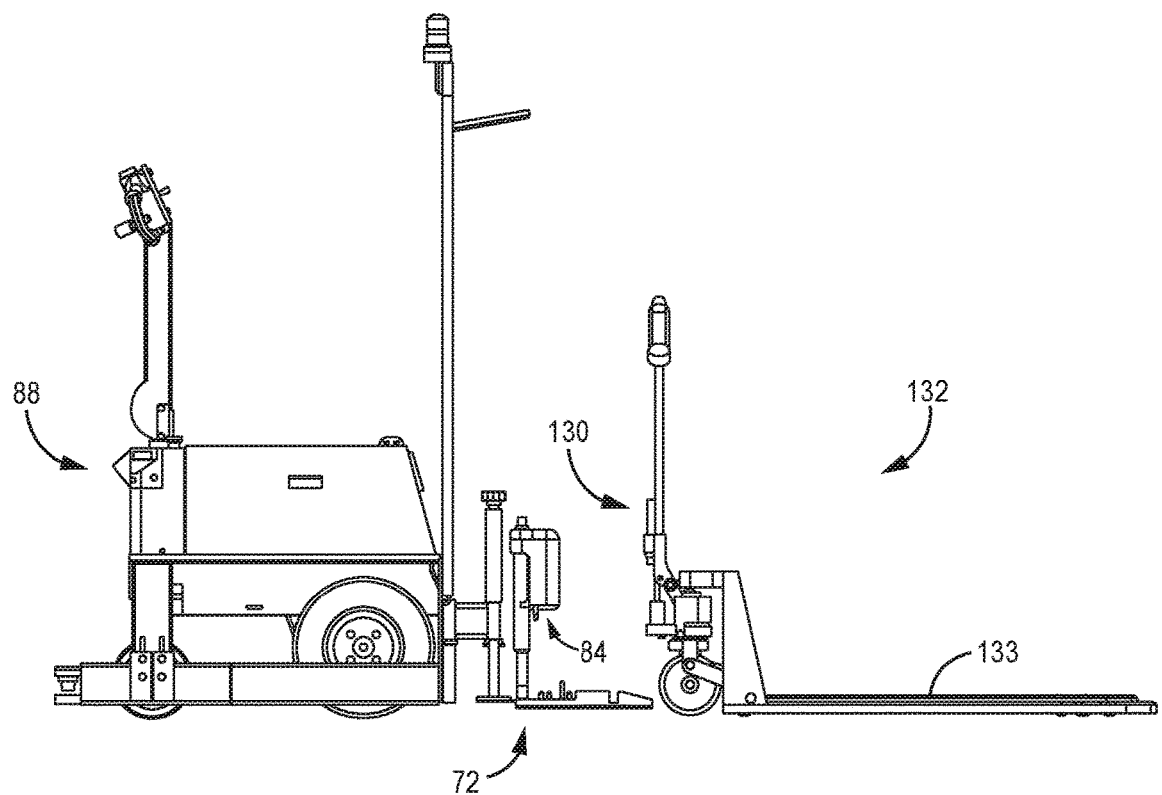
FIG. 7C is a side view of the interchangeable hitch assembly in the lowered and uncoupled position after being uncoupled from the manual pallet jack of FIG. 7A, according to one embodiment.
Figure 7D:
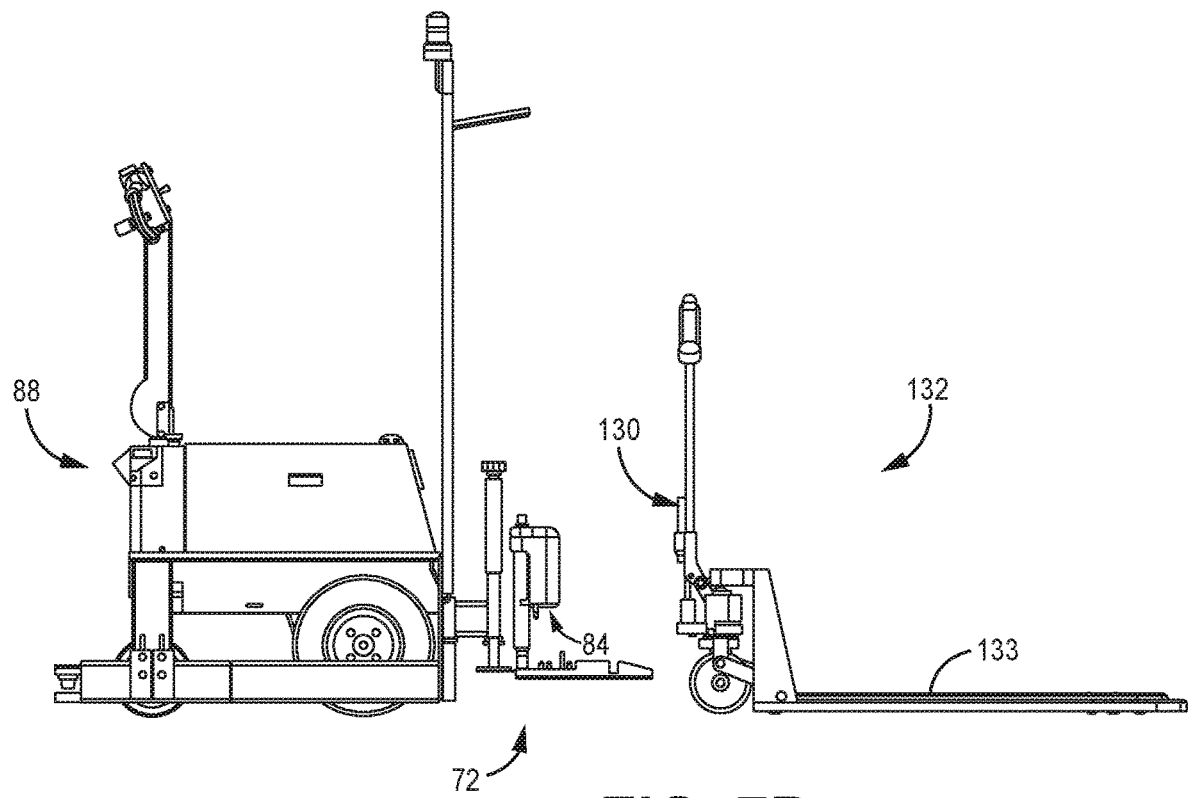
FIG. 7D is a side view of the interchangeable hitch assembly in the raised position after being uncoupled from the manual pallet jack of FIG. 7A, according to one embodiment.

In use, as shown according to one exemplary embodiment in FIGS. 7A-7D, the pusher device 88 (which is another known pusher device) is coupled to the manual pallet jack 132 as shown in FIG. 7A. In certain embodiments, the system 70 can be used to first lower the pallet jack 132 to unload the cargo thereon without unhitching the jack 132, as discussed above. That is, once the cargo on the pallet jack 132 is positioned as desired, a user can actuate the actuation mechanism 130 on the pallet jack 132 to depress or actuate the release button as described above, thereby lowering the forks 133 of the jack 132 and freeing the pallet jack 132 from the cargo such that the pusher device 88 and pallet jack 132 can back out and travel elsewhere as desired. Alternatively, if the pusher device 88 is to be uncoupled from the pallet jack 132, the hitching assembly 72 can be lowered such that the hitch 72 can be uncoupled from the pallet jack 132. More specifically, the actuation assembly 84 is actuated (either wirelessly or otherwise) by a user to urge the hitch 72 downward (as shown in FIG. 7B) until the hitch 72 unlatches from the pallet jack 132 as described above in detail. Once the hitch 72 is uncoupled from the jack 132, the pusher device 88 is moved in reverse, thereby moving the hitch 72 away from the jack 132 (as best shown in FIG. 7C). Once the hitch 72 is clear of the jack 132, the actuation assembly 84 is actuated to retract, thereby allowing the hitch 72 to move upward again (as shown in FIG. 7D) such that the pusher 88 can be easily transported to another location without the jack 132 or the cargo thereon.

Of course, it is understood that the process of coupling the hitch 72 to this pallet jack 132 or another pallet jack can be accomplished by performing the above steps in reverse.

It is understood that the specific exemplary configurations of the hitch embodiments 32, 72 as set forth herein are simply two examples of the type of configuration that is contemplated herein. That is, multiple hitches like hitches 32, 72 are contemplated that can have any appropriate mateable features that are necessary to couple to any of the known, commercially-available manual pallet jacks. More specifically, the fixed axles with swivel wheels on most commercial manual pallet jacks (like the fixed axle 24 and swivel wheels 20A, 20B discussed above) differ in size across different models and brands. That is, there is no standard fixed axle diameter or length within the manual pallet jack industry, so various different pallet jack brands (and models) have fixed axles that vary widely in both the diameter and length, thereby making it almost impossible to create a single hitch (like either of hitches 32, 72) that can be used with all the different brands. The various interchangeable hitch embodiments disclosed or contemplated herein make it possible to couple such hitch embodiments to most—if not all—commercial manual pallet jacks.

Further, it is also understood that while two specific exemplary pusher devices 30, 88 are depicted and discussed herein, any known pusher device can be incorporated herein, including, for example, the various pusher devices as disclosed in U.S. Pat. Nos. 6,880,652, 7,493,979, 7,571,914, 8,684,373, 9,393,978, 9,994,246, and 10,106,184, all of which are hereby incorporated herein by reference in their entireties.

According to a further embodiment in which the pusher device can be operated by an autonomous guidance system (a "self-driving pusher device"), the actuation of the actuation mechanism 130 on the pallet jack 132 to lower the pallet jack 132 and/or the lowering of the hitch 72 can be automatically triggered by the autonomous pusher positioning the pallet jack 132 in the desired position such that the pallet jack 132 is automatically lowered (by automatic actuation of the actuation mechanism 130) so that the autonomous pusher device and the pallet jack 132 can travel elsewhere. Alternatively, the hitch 72 is automatically uncoupled (by automatic actuation of the actuation assembly 84) so that the autonomous pusher device can travel elsewhere without the pallet jack 132.

Although the present invention has been described with reference to preferred embodiments, persons skilled in the art will recognize that changes may be made in form and detail without departing from the spirit and scope of the invention.

What is claimed is:

1. A manual pallet jack propelling system comprising:
   (a) a motive device comprising a motive device coupling structure;
   (b) a hitch mechanism removably coupled to the motive device coupling structure, the hitch mechanism comprising:
      (i) a proximal hitch body comprising a motive device coupling mechanism at a proximal end thereof, wherein the coupling mechanism is removably coupleable with the motive device coupling structure;
      (ii) a tensioned piston assembly comprising:
         (A) a stationary piston body fixedly coupled to the proximal hitch body; and
         (B) an extendable tensioned piston rod extending from the stationary piston body;
      (iii) a distal hitch body fixedly coupled to the extendable tensioned piston rod, wherein the distal hitch body is removably coupleable to a manual pallet jack at a mateable coupling structure;
      (iv) a mateable coupling structure disposed on the distal hitch body; and
      (v) an actuation assembly operably coupled to the distal hitch body, wherein actuation of the actuation assembly can urge the distal hitch body between a raised position and a lowered position; and
   (c) a release actuation mechanism disposed on the manual pallet jack, wherein the release actuation mechanism is disposed in contact with a hydraulic release button, wherein actuation of the release actuation mechanism causes actuation of the hydraulic release button.

2. The propelling system of claim 1, wherein the motive device is an autonomous motive device.

3. The propelling system of claim 1, wherein the extendable tensioned piston rod is moveable between a retracted position and an extended position.

4. The propelling system of claim 3, wherein a movement of the piston rod into the extended position corresponds to a movement of the distal hitch body into the lowered position and movement of the piston rod into the retracted position corresponds to the movement of the distal hitch body into the raised position.

5. The propelling system of claim 1, further comprising a remote control in communication with the actuation assembly, wherein the remote control comprises a first actuation mechanism for actuating the actuation assembly to urge the distal hitch body into the lowered position.

6. The propelling system of claim 5, wherein the remote control is in communication with the release actuation mechanism, wherein the remote control comprises a second actuation mechanism for actuating the release actuation mechanism to actuate the hydraulic release button.

7. A hitching system for coupling to a manual pallet jack, the system comprising:
(a) a hitch mechanism comprising:
 (i) a distal hitch body comprising a mateable coupling structure disposed on the distal hitch body;
 (ii) a proximal hitch body;
 (iii) a tensioned piston assembly coupled to the proximal hitch body and the distal hitch body; and
 (iv) an actuation assembly operably coupled to the distal hitch body, wherein actuation of the actuation assembly can move the distal hitch body between a raised position and a lowered position; and
 (v) a motive device coupling mechanism disposed at a proximal end of the proximal hitch body; and
(b) a release actuation mechanism disposed on the manual pallet jack, wherein the release actuation mechanism is disposed in proximity with a release button, wherein actuation of the release actuation mechanism causes actuation of the release button.

8. The hitching system of claim 7, wherein the mateable coupling structure comprises a notch.

9. The hitching system of claim 7, wherein the tensioned piston assembly is moveable between a retracted configuration and an extended configuration.

10. The hitching system of claim 9, wherein the retracted configuration is an untensioned configuration and the extended configuration is a tensioned configuration.

11. The hitching system of claim 9, wherein movement of the tensioned piston assembly into the extended configuration causes the distal hitch body to move into a lowered position.

12. The hitching system of claim 9, wherein movement of the tensioned piston assembly into the retracted configuration causes the distal hitch body to move into a raised position.

13. The hitching system of claim 7, wherein the tensioned piston assembly comprises:
(a) a stationary piston body fixedly coupled to the proximal hitch body; and
(b) an extendable tensioned piston rod extending from the stationary piston body, the extendable tensioned piston rod fixedly coupled to the distal hitch body.

14. A pallet jack hitching system comprising:
(a) a hitch mechanism comprising:
 a proximal hitch body removably coupleable to a motive device;
 (ii) a tensioned piston assembly fixedly coupled to the proximal hitch body; and
 (iii) a distal hitch body movably coupled to the tensioned piston assembly, the distal hitch body comprising a mateable coupling structure disposed on the distal hitch body, wherein the mateable coupling structure is mateable with a manual pallet jack; and
 (iv) an actuation assembly operably coupled to the distal hitch body, wherein actuation of the actuation assembly can move the distal hitch body between a raised position and a lowered position; and
(b) a release actuation mechanism disposed on the manual pallet jack, wherein the release actuation mechanism is disposed in proximity with a release button, wherein actuation of the release actuation mechanism causes actuation of the release button.

15. The hitching system of claim 14, wherein the distal hitch body further comprises an angled coupling feature defined at or near a distal end of the distal hitch body.

16. The hitching system of claim 14, wherein the mateable coupling structure comprises a notch.

17. The hitching system of claim 14, wherein the tensioned piston assembly comprises:
(a) a stationary piston body fixedly coupled to the proximal hitch body; and
(b) an extendable tensioned piston rod extending from the stationary piston body, wherein the extendable tensioned piston rod is coupled to the distal hitch body.

18. The hitching system of claim 17, wherein the extendable tensioned piston rod is moveable between a retracted position and an extended position.

19. The hitching system of claim 18, wherein the retracted position is an untensioned position and the extended position is a tensioned position.

20. The hitching system of claim 18, wherein movement of the piston rod into the extended position causes the distal hitch body to move into a lowered position and movement of the piston rod into the retracted position causes the distal hitch body to move into a raised position.

* * * * *